Patented Dec. 2, 1941

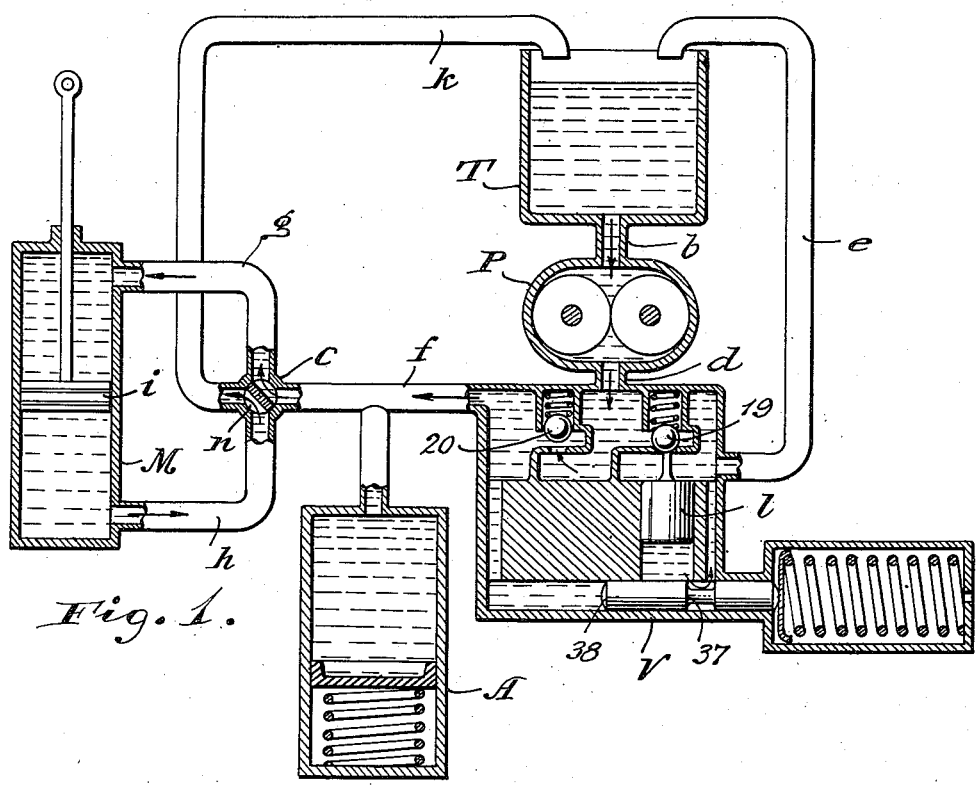

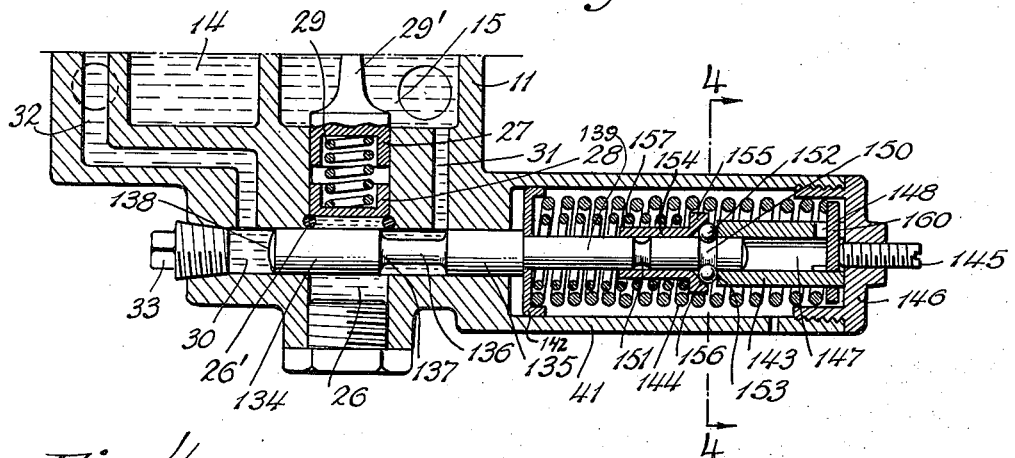
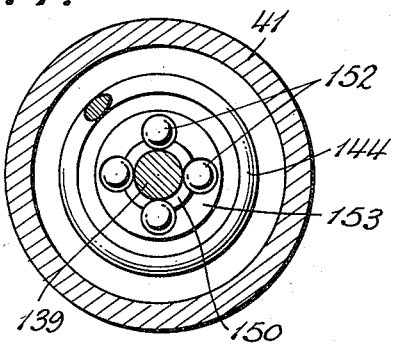
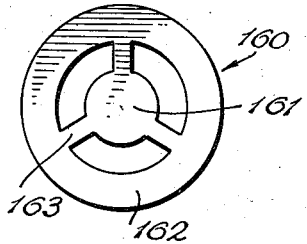
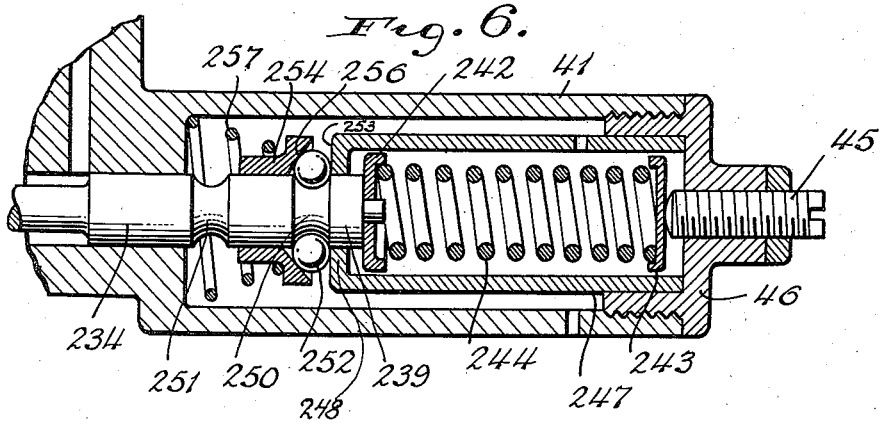

2,264,375

UNITED STATES PATENT OFFICE 2,264,375

UNLOADING VALVE

Frank Leroy Hill, Garden City, and Clifford Francis Thompson, Mineola, N. Y., assignors to Air Associates, Inc., Garden City, N. Y., a corporation of New York Application May 16, 1939, Serial No. 273,872

16 Claims. (Cl. 137—153)

The present invention relates to a pressure regulating valve for a pressure-medium system, and more particularly to an unloading valve for a high pressure hydraulic system. The invention contemplates the provision of a valve of the said type for systems where it is desirable to maintain the working pressure in the operating part of the system at all times, notwithstanding the fact that this pressure is utilized comparatively infrequently, and where the pressure generator is required to operate continuously. A system of that kind is for example the hydraulic system of an airplane in which the pump is permanently coupled to the engine, and a safety valve for limiting the pressure to a predetermined maximum value is required.

The ordinary method of accomplishing this is by means of the conventional spring loaded relief valve which allows fluid to pass through it and back to the reservoir only when sufficient pressure is available to lift the valve from its seat against spring pressure. This spring pressure of necessity must be adjusted to maintain the highest pressure that will ever be required in the system. The pressure is maintained in the system only by virtue of the fact that the valve opens just enough to allow passage of an amount of fluid corresponding to the capacity of the pump at the particular pressure for which the valve is adjusted. Furthermore, the pump operates at maximum load at all times when useful work is not being performed in the system and dissipates its energy in the relief valve. The energy appears as a rise in temperature at the relief valve sometimes requiring the use of cooling systems, etc. to prevent dangerous temperatures from being attained.

To obviate the above difficulty, it is desirable to unload the pump at such times as useful work is not required of it by providing an unrestricted path for the fluid delivered by the pump back to the reservoir. It is also desirable to maintain pressure in the operating part of the system and to incorporate automatic means for transferring the output of the pump to the work performing parts of the system whenever desired. The net result of such an arrangement would be that the pump is standing by at no load but capable of instantly delivering energy to the system when called for, with no additional attention required of the operator than manipulation of the controls of the work performing units.

The invention mainly consists in a relief or bypass valve which is operated by an actuating member under the pressure in the working part of the system to which it is applied, the pressure being admitted to the actuating member with the aid of a control member when the pressure exceeds a predetermined value.

The invention further consists of a detent mechanism in connection with said control member to lock the latter in its controlling positions which detent will release the controlling member when a force acting thereupon exceeds a predetermined value.

Further objects and details of the invention will be apparent from the description hereinafter and the accompanying drawings illustrating the invention by way of example.

In the drawings:

Fig. 1 is a diagrammatic illustration partly in section of a hydraulic system comprising a valving device according to our invention.

Fig. 2 is a longitudinal section of an embodiment of the invention, showing the relief valve in open position.

Fig. 3 shows a modification with a detent mechanism in section.

Fig. 4 is a section along line 4—4 of Fig. 3.

Fig. 5 is an elevation of a part of the embodiment shown in Fig. 3 and

Fig. 6 shows another modification with a detent mechanism in section.

Referring now to Fig. 1, showing, by way of example, a pressure-medium system of a type useful for the hydraulic system in an airplane, there is a supply tank T to which the feeding pipe $b$ of a pressure generator or pump P is connected. Another pipe $d$ leads from the pressure side of the pump to a valving device V, and a pipe $e$ constitutes a low or no pressure branch of the system, through which pressure medium, either a liquid in a hydraulic system or a gaseous medium in a compressed air system, may be returned to the supply tank T. A third pipe $f$, connects the valve device V with a controlling member for instance valve C, which may be operated to admit through pipes $g$ and $h$ the pressure medium to the one or the other side of the driven organ such as piston $i$ of a pressure actuated and work performing part or machine M.

A pipe $k$ serves to return the pressure medium from the machine M through the control device C to the supply tank T. It is obvious that the return leads $e$ and $k$ need not have their ends at the top of tank T. In fact, they may be connected with each other and with the supply side of the pressure generator P in any suitable manner and at any suitable point. The control member C is preferably of a type having three positions so as to either connect one of the sides of the piston or like member $i$ with the high pressure pipe $f$ and the other side with the return $k$, or to cut off the high pressure, i. e. to shut off pipe $f$. An accumulator of conventional type as indicated at A may be attached to pipe $f$ between the valving device V and the control member C in order to equalize the pressure during the operation of the machine M.

The valving device V more clearly shown in Fig. 2, serves the purpose of regulating the pressure during the operation of the machine M, and also to unload the permanently running pump P at least partly, when the machine is not in operation. In the illustrated embodiment, the valving device comprises a casing 11 subdivided by partitions 12 and 13 in three chambers 14, 15 and 16 to which the three pipes $d$, $e$ and $f$ are respectively connected. Each of the partitions has an opening with a seat 17 and 18 respectively for a valve body such as balls 19 and 20. Valve 19 is a by-pass valve so arranged as to open into chamber 14, and valve 20 is a check valve opening into chamber 16. In order to return the valves readily to their seats from their open positions, springs 21 and 22 of suitable force may be provided so as to bear against the bottoms of cap screws 23 and 24. The cap screws serve as closures of openings in the casing 11, through which the valve seats 17, 18, valves 19, 20 and springs 21, 22 may be inserted in assembling the device. For reasons to be explained hereinafter, cap screw 23 may be provided with an interior projection 25 adapted to limit the opening stroke of the valve 19. Now, it is clear, that pressure admitted through pipe $d$ from pump P to chamber 14 urges valve 19 upon its seat and lifts valve 20 against the force of spring 22 and the pressure prevailing in chamber 16 to enable a current to flow to the machine M through control member C. This position of the parts is shown in Fig. 1. Means are provided to prevent the pressure in chamber 16 and branch $f$ to exceed a predetermined value. According to the invention, this means is responsive to the pressure difference between the chamber 16 and chamber 15. For the said purpose a fourth chamber 26 opening into chamber 15 is formed in casing 11, and, in the present embodiment opposite valve 19 with respect to its seat 17. The lower end of chamber 26 is closed by means of a screw 40. In this chamber, a member adapted to lift valve 19 is slideably arranged. Said member may consist of a plunger $l$ as shown in Fig. 1. In its preferred form, however, the by-pass valving mechanism is so designed that the valve operates in the manner of a snap valve which, when once starting to move from its closed to its fully open position or vice versa, does not stop in an intermediate position. For this purpose, the valving mechanism illustrated in Fig. 2 comprises two pistons 27 and 28 and a compression spring 29 tending to hold the pistons apart. A snap ring 26' arranged in the wall of chamber 26 limits the lowest positions of piston 28. The upper piston 27 is provided with an extension 29' reaching through chamber 15 so as to engage the lower side of the valve ball 19. It is immaterial whether ball 19, piston 27 and extension 29 are separate pieces or formed as a one-piece body provided the ball may be displaced between its seat and the aforementioned projection 25 of cap screw 23. Means are provided to expose the interior of chamber 26 to the pressure prevailing in chamber 15 or to that of chamber 16, depending on two different values of the pressure in chamber 16. For this purpose a fifth chamber 30 is formed in casing 11, which chamber communicates with the chambers 15 and 16 by means of passages 31 and 32 respectively. Chamber 30 extends substantially perpendicularly with respect to the axis of chamber 26, and is closed on the one end by suitable means such as a screw stud 33. A slide valve or plunger 34 is closely fitted and movably arranged in chamber 30, and said passage 32 opens into chamber 30 at a point between said screw stud 33 and plunger 34 in such a manner that the front end of plunger 34 is permanently subject to the pressure prevailing in chamber 16. The rear plunger end 35 projects from chamber 30 for a purpose to be described hereinafter. Plunger 34 has a recessed portion 36 intermediate its ends and two controlling edges 37 and 38, edge 37 being the front edge of said recess and edge 38 being the edge of the front face of the plunger. The distance of the edges 37, 38 and the length of recess 36 are so dimensioned that in the one end position of the plunger as illustrated in Fig. 1, the recess 36 establishes a communication between chamber 26 and chamber 15 while the plunger front portion prevents the pressure of chamber 16 to pass into chamber 15. In the other end position shown in Fig. 2, the front edge 38 has receded so far as to open up a connection between chambers 26 and 30 while the non-recessed portion of the plunger 34 between chamber 26 and passage 31 shuts off chamber 26 from chamber 15.

The rear end 35 of plunger 34 projects into a hollow extension 41 of casing 11. Within extension 41, two plate-like members 42 and 43 are provided which are spaced from each other by a compression spring 44. An adjustment screw 45 passes through a cover 46 of extension 41 and bears against plate 43, while the rear end 35 of the plunger bears against plate 42. Consequently, the pressure on the front face of plunger 34 tends to shift the latter towards the right side while spring 44 counteracts such movement, and holds the plunger in the position of Fig. 1 in which the lower portion of chamber 26 communicates via recess 36 and passage 31 with chamber 15.

Provided the various surfaces exposed to pressure, and the springs of the device V are correctly dimensioned as will be explained hereinafter, the system with the device according to the invention operates in the following manner:

Assuming pump P is coupled to an engine so as to be permanently driven and the control member C is in the position indicated in Fig. 1, then, fluid will be pumped from tank T through pipe $b$, pressure generator or pump P, pipe $d$ into chamber 14 of valving device V. In virtue of the pressure thus created in that chamber, valve 20 will be lifted from its seat to permit pressure medium to pass on into chamber 16, and further on through pipe $f$, control member C, pipe $g$ into machine M on top of piston $i$ which will be moved downward. Simultaneously fluid returns from the lower chamber of machine M through pipe $h$, control member C and pipe $k$ to tank T. During the operation of machine M valve 19 rests on its seat owing to the force of spring 21 and the difference between the higher pressure in chamber 14 and the lower pressure in chamber 15. The valve actuating mechanism 27, 28, 29, 29' is inoperative because the same pressure prevails in chamber 26 as in chamber 15. When the piston $i$ reaches its end position, or when control member C is closed, the continuously operating pump P causes a pressure rise in the branch $f$ of the system whereby accumulator A fills up. Simultaneously, the pressure rising in chambers 14 and 16, passage 32 and chamber 30 urges piston 34 gradually towards the right hand side against the action of spring 44. Thereby, control edge 37 first moves beyond chamber 26 thus disconnecting the communication of chamber 26 with chamber 15. Upon a further rise of the pressure in chamber 30, edge 38 of plunger 34 opens the communication between chambers 16, 30 and 26. If, now, there is only one piston $l$ as shown in Fig. 1, the piston and with it the associated valve will be lifted when the force of the spring and the pressure difference acting on the ball are overcome by the pressure difference acting on the piston $l$. However, the structure of Fig. 1 has a certain drawback, owing to the fact that the valve may alternately open and close in rapid succession if the differences of the counteracting forces on the valve 19 are only slight. This drawback is overcome by the structure according to Fig. 2. As soon as the pressure rises in chamber 26 for reasons explained hereinbefore, piston 28 will be moved upward against the force of spring 29 without immediately transmitting the upward movement to piston 27 and valve 19. That means, there is a certain lost motion between pistons 28 and 27 since the initial force of the expanded spring 29 is smaller than the forces holding down the valve 19 and thus, piston 27 with extension 29'. The area of piston 28 and the spring 29 are preferably so dimensioned that the spring is not yet solidly compressed when the force acting on piston 27 through spring 29 overcomes the downward directed forces. However, it is to be understood that the device is operable also if the movement of piston 28 is positively transmitted to piston 27 through contacting surfaces be it of the spring convolution, be it of the pistons 27 and 28 proper provided sufficient lost motion may take place that the force of the compressed spring 29 is greater than the forces acting on valve 19 in a direction to close it when it is in completely open position. As soon as the spring 29 is sufficiently compressed owing to the pressure prevailing in chamber 26, piston 27 will participate in the further upward movement of piston 28, thereby forcing the valve 19 open. When, now, the valve has been slightly lifted from its seat, the downward pressure on the valve owing to the pressure difference between chambers 14 and 15 will be materially decreased with the result that spring 29 may expand to shift piston 27, and, thus, valve 19 further upwards until the latter abuts against the projection 25.

As soon as valve 19 opens in the manner described a material pressure drop occurs in chamber 14 which has for a result that the pressure in branch $f$ of the system and chamber 16 exceeds the pressure in chamber 14 so as to close valve 20. This position of the valves is shown in Fig. 2. With the valve device in the position of Fig. 2, there is still a high pressure prevailing in chamber 16 and branch $f$, sufficient to start the operation of the machine M upon actuation of control member C, and to hold piston 28 and associated parts in their upper end position. In consequence thereof, fluid passes freely from chamber 14 to chamber 15 and through pipe $e$ to tank T under the action of pump P which is idling or unloaded inasmuch as its output need not be higher than required to circulate the fluid from the tank through the chambers 14 and 15 and back again.

If now, control member C is operated for actuation of machine M, a pressure drop will occur in the branch $f$ and chamber 16 and propagate itself through passage 32 to chambers 30 and 26. Owing thereto, spring 44 will shift plunger 34 back to its original position of Fig. 1, thereby disconnecting the communication of chamber 26 with chamber 16 and re-establishing connection of chambers 15 and 26 through passage 31 and plunger recess 36. In consequence thereof, the pressure in chamber 26 will drop to that of chamber 15, and the downward forces acting on valve 19 will push down the latter together with the piston mechanism 27, 28, to their original position so as to close the passage between chambers 14 and 15. Presently, the pressure in chamber 14 will rise through the agency of the pump now acting under load until valve 20 is lifted from its seat so that the pressure necessary for operating mechine M is maintained. Thus, the device according to the invention, serves the purpose of preventing an undue overloading of the pump, of unloading the pump when no energy is required to drive the machine M, and of simultaneously maintaining the pressure in the high pressure branch of the system on a value sufficient to start machine M and to keep it going until the pump P during its changing over from idling to full load has raised the pressure in chamber 14 to that required for continuing the operation of the machine M.

From the foregoing it will be clear that opening of valve 19 does not occur before a predetermined value of superpressure has been reached in branch $f$, sufficient to force plunger 34 back to establish connection of chamber 30 with 26, and that a pressure drop to a value in the neighborhood of the normal operating pressure is required to reestablish the communication of the chambers 26 and 15 and to close valve 19. It will be seen, therefore, that the pressure in the operating branch $f$ of the system, will fluctuate between limits determined by the characteristics of spring 44. This spring can therefore be used as a pressure adjusting means for the entire system, by manipulation of the adjusting screw 45. Furthermore, it will be clear that valve 20 is necessary only in order to maintain the branch $f$ of the system under operating pressure while pump P is idling, and to unload pump P to a minimum depending on the resistances to the flow of the pressure medium from the tank T through chambers 14 and 15 and back again. In certain cases where neither such total unloading nor the maintaining of the operating pressure in branch $f$ are required valve 20 may be omitted, in other words chambers 14 and 16 may be united to form one chamber. In that event, the valve-mechanism 19, 27, 28, 29 with plunger 34 and spring 44 may be employed in the place of a conventional relief or safety valve with many of the aforementioned advantages inherent in the particular structure of the mechanism.

It has been described in the foregoing in what manner the valve 19 is prevented, according to the invention, from oscillatory movements, when the forces acting on the valve are almost balanced. Similarly, an oscillatory movement of the plunger or slide-valve 34 may occur owing to the counteracting force of the spring 44 and the pressure acting on the front face of the plunger. Such oscillatory movements may become annoying if they occur in the two positions in which the plunger is just about to establish or disconnect the communication of chamber 26 with either chamber 16 or 15, because such movements would propagate themselves to piston 28 and spring 29. Means may be provided to avoid the indicated drawback by a detent in connection with plunger 34. Such detent should be of a type capable of releasing its grip when the force acting upon it exceeds a certain predetermined value.

A suitable structure, according to the invention, is illustrated in Figs. 3, 4 and 5. In these figures the casing 11 of the entire valve mechanism is similar to that of Fig. 2 and the various chambers therein with valves and the valve actuating device are also similar to the previously described embodiment and denoted with the same reference characters, except for the slide valve or plunger controlling the communication of chamber 26 with chambers 15 and 16. In the embodiment of Fig. 3, plunger 134 has a recessed portion 136 and controlling edges 137 and 138 arranged in the same manner and for the same purpose as the equivalent parts of plunger 34 in Fig. 2. The end portion 135, however, of plunger 134 has an extension 139 of a diameter slightly smaller than that of portion 135, thus offering an abutment for an aperture provided plate 142 through which extension 139 is passed. A stationary member 143 is located within the casing portion 41 and bears against the bottom of the cover 146. Member 143 has a longitudinal cavity 147 to receive therein the end portion of the plunger extension 139, and a plurality of slots 148 in its side wall near the cover 146. Another plate 160, separately shown in Fig. 5, and comprising a central portion 161, a peripheral portion 162 and as many arms 163 between portions 161 and 162 as there are slots in member 143 fits into and around the slotted end of said member and bears against the adjustment screw 145 in cover 146. A compression spring 144 is interposed between plate 142 and portion 162 of plate 160 and serves the same purpose as spring 44 in Fig. 2. The plunger extension 139 is provided with two peripheral grooves 150, 151 which are coordinate to the two end positions of the plunger 134. A plurality of balls 152 are adapted to bear against the front face 153 of member 143 and to engage that one of the grooves 150 and 151 which is just in front of said face 153. A sleeve 154 surrounds the plunger extension 139 so as to slide freely thereon. Said sleeve has a flange-like portion 155 at its end directed towards stationary member 143 and an inwardly inclined face 156 of portion 155. Another spring 157 weaker than spring 144 is arranged interiorly of and coaxial with spring 144 and bears against plate 142 and the sleeve flange 155.

Now, it is clear, that upon a longitudinal movement of plunger 134 from the position of Fig. 3 towards the right hand side, the inclined face of the groove 150 will force the balls 152 to move outward on the face 153. Such movement of the balls is resisted by the inclined face 156 of sleeve 154 under the action of spring 157 until the force tending to shift the plunger 134 towards the right side overcomes the spring force. If this is the case, the balls forced outwardly will push the sleeve 154 towards the left until the plunger extension portion between grooves 150 and 151 can pass through the set of balls 152. As soon as groove 151 reaches the place of the balls upon a continued movement of the plunger, the balls will engage groove 151 under the action of spring 157 and the inclined surface 156.

When the plunger is to be returned to its original position the right hand face of the groove 151 will urge the balls against the inclined face 156 so as to shift sleeve 154 against the action of the spring 157. The same force moves the balls outward until the plunger extension can pass on, and the balls will re-engage the groove 150 as soon as it has reached the position of Fig. 3.

Now, it will be clear, that the force with which the balls 152 hold the plunger 134 locked in its end positions does not only rely on the force of the spring 157 but also very materially on the inclination of the face 156 as well as on that of the side walls of the grooves 150 and 151. By correctly selecting the dimension of the spring 157 and of the angles of inclination, the detent may be adapted to resist a predetermined force. However, care should be taken in any event, to avoid certain relative inclinations of the co-operative faces which may cause a jamming of the balls in a locked position.

It will be noticed that in the embodiment of Fig. 3 the locking force of the detent mechanism is stronger when the balls engage groove 151 than when they engage groove 150, because spring 157 will be more and more compressed as the piston advances to the right side. Hence, the pressure drop required to cause the piston to leave its right hand end position, would have to be greater than the pressure increase necessary to move the piston out of its left hand position. This may be favorable in certain cases, in others, however, in which such difference is not desirable, the modification of Fig. 6 may be applied.

In this modification, the casing portion 41 is provided with a cover 46 and adjustment screw 45. The plunger or slide valve 234 has an end portion 239 extending into casing 41 and provided with two grooves 250 and 251 according to the plunger end positions respectively. The rear face of the plunger is provided with a plate 242, and another plate 243 abuts against the adjustment screw 45 which serves to adjust, in certain limits, the tension of a compression spring 244. Spring 244 bears against both plates 242 and 243 and corresponds as to its function to the spring 44 of Fig. 2 and 144 of Fig. 3. A tubular member 247 rests on the bottom of cover 46 and has a forward flange 248 with front face 253 through which the end portion 239 of the plunger is passed. In front of said face 253, a set of balls 252 and a sleeve 254 with inwardly inclined face 256 are arranged in a manner and for a purpose similar to that of the corresponding parts of the embodiment illustrated in Fig. 3. A compression spring 257 bearing against the bottom of casing 41 and the sleeve 254 tends to hold the latter in the position of Fig. 6. This detent mechanism operates in a manner similar to that described with reference to Fig. 3, with the difference, however, that the springs acting on the plunger and on the sleeve respectively, are independent from each other, with the result that the locking force of the balls is the same with respect to groove 250 as to groove 251.

The valving device according to the invention serves the purpose indicated hereinbefore. In addition thereto, it offers the advantage that the forces required to actuate the by-pass or relief valve are only slightly greater than the forces tending to press the valve body upon its seat.

Furthermore, the spring forces counter-acting the pressure on the slide valve or plunger which controls the actuation of the by-pass valve may also be small depending on the size of the area of the plunger exposed to the high pressure to which the plunger responds.

While we have described our invention in connection with a hydraulic system it is equally applicable to systems in which compressed air or another gaseous fluid is used as a pressure medium.

It will be understood that our invention is not limited to the details of construction shown, and other forms, modifications and combinations may be used without departing from the spirit or scope of the invention.

We claim:

1. A pressure regulating device comprising a high pressure chamber and a low pressure chamber, a first check valve member between said chambers, a third chamber, a conduit between said high pressure chamber and said third chamber, a check valve member controlling communication of said high pressure chamber with said conduit, an actuating member responsive to pressure prevailing in said third chamber, said actuating member being responsive to pressure alterations so as to cause said first valve to establish communication between said high pressure chamber and said low pressure chamber at a predetermined pressure acting upon said actuating member, a control member responsive to the pressure in said conduit and adapted to subject said actuating member to the pressure of said conduit when the last mentioned pressure exceeds a predetermined value, an adjustable means associated with the control member to predetermine the pressure to which the control member will respond, and detent means to assist the adjustable means in maintaining either of two positions of the control member.

2. A pressure regulating device comprising a high pressure chamber, a low pressure chamber, a check valve member between said chambers, a third chamber, an actuating member responsive to pressure prevailing in said third chamber so as to open said valve at a predetermined pressure value, a lost motion and lost motion take-up connection between said valve member and said actuating member whereby said valve member opens completely when caused to commence its opening movement, a spring, and a control member responsive to the pressure in said high pressure chamber against the force of said spring to establish communication of said third chamber with said high pressure chamber at a pre-determined pressure in the latter, and to establish communication of said third chamber with said low pressure chamber at another predetermined value of the pressure in the high pressure chamber and detent means to assist the spring in holding either of two positions when attained.

3. A pressure regulating device comprising a casing including four chambers, an automatic check valve between said first and said second chamber, a spring-loaded second valve between said first and said third chamber, a piston device in said fourth chamber, said piston device including a first piston, a second piston, and a compression spring between said pistons, said piston device being adapted to open said second valve, a spring-loaded third valve member responsive to the pressure in the second chamber for alternately connecting said fourth chamber with said second and said third chamber, upon two determinable different pressure values prevailing in said second chamber, said first chamber having a pressure intake port, said second chamber having a pressure output port, and said third chamber having a return port.

4. A device as claimed in claim 3, in which said compression spring is so dimensioned in relation to the area of said pistons that the maximum force of said pistons is insufficient to entirely compress said spring.

5. A pressure regulating device comprising a casing including five chambers, an automatic check valve between said first and said second chamber, a spring-loaded second valve between said second and said third chamber, a piston member in said fourth chamber adapted to actuate said second valve, said second, third and fourth chamber opening into said fifth chamber, a plunger in said fifth chamber which divides the chamber into two pressure areas, said plunger having surfaces for controlling said openings of said third and said fourth chambers so as to alternately establish communication of the fourth chamber with the third chamber and with the fifth chamber, and being, in its one end position, subjected to the pressure prevailing in said second and said fifth chamber, and a spring tending to hold said plunger against said pressure in the other end-position in which said third chamber is in communication with said fourth chamber.

6. A pressure regulating device as claimed in claim 5, in which said plunger is provided with a resiliently yielding detent to hold it, in two predetermined end-positions, non-responsive to slight alterations of the pressure to which it is subjected.

7. In a pressure-medium system, a detent device for a control plunger comprising a cylindrical end extension of said plunger, said end extension being provided with a number of peripheral grooves corresponding to the positions in which the plunger is to be detained, a stationary member through which at least a portion of said extension may pass, a movable sleeve surrounding said extension, a spring so arranged as to push said sleeve towards said stationary member, a plurality of balls between an end face of said sleeve and said stationary member, said end face of said sleeve being inwardly inclined, and the angle of inclination of said face differing from that of the side walls of said grooves with respect to the plunger axis.

8. In a pressure medium system, a first branch including a pressure supply port, a high pressure outlet branch, a low pressure return branch, automatic means responsive to a pressure difference between said high pressure branch and said low pressure branch, and operative to connect said first branch with said low pressure branch at a pre-determined value of said pressure difference and to disconnect said last mentioned branches at a lower predetermined value, and automatic means responsive to pressure differences between said first branch and said high pressure branch and operative to connect said first branch with said high pressure branch when the pressure in the high pressure branch is lower than in the first branch and to disconnect said first branch from said high pressure branch when the pressure in the high pressure branch is higher than in the first branch, and means to adjust said automatic means to operate at a predetermined operating pressure and detent means to hold the automatic means in either of two positions.

9. A pressure regulating device comprising a high pressure chamber, a low pressure chamber, a by-pass valve controlling a passage between said chambers and being exposed to the pressure difference between said high and said low pressure chambers, a spring in connection with said valve and being so arranged as to snap open said valve when said spring is compressed, a movable member being on the one side in operative connection with said spring so as to compress it, and with its other side exposed to a variable pressure, and controlling means including a second spring and being responsive to the pressure prevailing in said high pressure chamber, said controlling means being adapted to subject said movable member to the pressure of said high or said low pressure chamber according to predetermined maximum or minimum values respectively of the pressure prevailing in said high pressure chamber and detent means to hold the maximum or minimum position.

10. A pressure regulating device comprising a first high pressure chamber, a second high pressure chamber, a low pressure chamber, a check valve controlling a passage between said first and second high pressure chambers and being exposed to the pressure difference between said first and second high pressure chambers, a by-pass valve operative independently of said check valve and controlling a passage between said first high pressure chamber and said low pressure chamber and being exposed to the pressure difference between said high and low pressure chambers, a pair of pistons held apart by a spring, the one piston being so arranged as to bear against the by-pass valve to open said valve with a snap action when said spring is compressed, the other piston exposed to a variable pressure, and controlling means under the influence of said variable pressure including a second spring, said spring being responsive to the pressure prevailing in said second high pressure chamber, said controlling means being adapted to move in response to the pressure change in said high pressure chamber, according to predetermined maximum or minimum values respectively of the pressure prevailing in said second high pressure chamber and detent means to hold the controlling means in either of two positions.

11. A pressure regulating device comprising a high pressure chamber, a low pressure chamber, a by-pass valve controlling a passage between said chambers, a first spring so arranged as to tend to close said valve, a second spring in connection with said valve and being so arranged as to counteract said first spring when said second spring is compressed, a movable member being on the one side in operative connection with said second spring so as to compress it, and with its other side exposed to a variable pressure, and controlling means being adapted to subject said movable member to the pressure of said high or said low pressure chamber according to predetermined maximum or minimum values respectively of the pressure prevailing in said high pressure chamber.

12. A pressure regulating device comprising a first high pressure chamber, a second high pressure chamber, a low pressure chamber, a check valve controlling a passage between said first and second high pressure chambers and being exposed to the pressure difference between said first and second high pressure chambers, a by-pass valve controlling a passage between said first high pressure chamber and said low pressure chamber and being exposed to the pressure difference between said high and low pressure chambers, a first spring so arranged as to tend to close said by-pass valve, a pair of pistons held apart by a second spring, the one piston being so arranged as to bear against the by-pass valve to open said valve when said second spring is compressed, the said second spring being so arranged as to counteract said first spring when said second spring is compressed, the other piston associated with the second spring being exposed to a variable pressure, and controlling means including a third spring and being responsive to the pressure prevailing in said second high pressure chamber, said controlling means being adapted to move in response to the pressure change in said high pressure chamber, according to predetermined maximum or minimum values respectively of the pressure prevailing in said second high pressure chamber.

13. A pressure regulating device comprising two high pressure chambers, a check valve controlling communication of the first chamber with the second chamber, the first high pressure chamber having a pressure port and a return port, a low pressure chamber, a valve member controlling a passage between said first high pressure chamber and said low pressure chamber, a spring in connection with said valve and being so arranged as to open said valve when said spring is compressed, a fourth chamber, a piston movable in said fourth chamber, said piston being on its one side operatively connected with said spring and on its other side exposed to the pressure prevailing in said fourth chamber, and controlling means responsive to the pressure prevailing in the second high pressure chamber, said controlling means being adapted to connect said fourth chamber with said second high pressure chamber or with said low pressure chamber according to predetermined maximum or minimum values respectively of the pressure prevailing in said second high pressure chamber.

14. In a device of the type described, a check valve and by-pass valve system comprising two high pressure chambers, a low pressure chamber, a valve member controlling communication of said two high pressure chambers, a valve member controlling communication between said first high pressure chamber and said low pressure chamber, a first and a second spring on the high pressure and the low pressure sides respectively of said valve member, one end of each of said springs being operatively connected with said valve member in opposite relation, the other end of said first spring being held stationary, a movable member having one side operatively connected with the other end of said second spring and its other side exposed to a variable pressure, whereby said valve member will spring into completely open position when the compression of said second spring, owing to an increase of said variable pressure, overcomes the compression of said first spring and the high pressure loading said valve member in its closed position.

15. In a device of the type described, a valve system comprising a first high pressure chamber, a second high pressure chamber, a low pressure chamber, a check valve member controlling communication of said first and second high pressure chambers, whereby the check valve will open when the pressure difference reaches a predetermind value and close when the pressure difference drops below that value, a by-pass valve member controlling communication of said first high pressure chamber and said low pressure chamber, a first and a second spring on the high pressure and low pressure sides respectively of said by-pass valve member, one end of each of said springs being operatively connected with said by-pass valve member in opposite relation, the other end of said first spring being held stationary, a movable member having one side operatively connected with the other end of said second spring and its other side exposed to a variable pressure, whereby said by-pass valve member will snap open when a variable pressure reaches a predetermined value compressing said second spring which overcomes the compressive force of said first spring and the high pressure loading said valve member in its closed position.

16. A pressure regulating device comprising a casing including five chambers, an automatic check valve between said first and second chamber, a spring-loaded second valve between said second and said third chamber, a piston member in said fourth chamber adapted to actuate said second valve, said second, third and fourth chamber opening into said fifth chamber, a plunger in said fifth chamber which divides the chamber into two pressure areas, said plunger having surfaces for controlling said openings of said third and said fourth chambers so as to alternately establish communication of the fourth chamber with the third chamber and with the fifth chamber, and being, in its one end position, subjected to the pressure prevailing in said second and said fifth chamber, and an adjustable compression spring tending to hold said plunger against said pressure in said second and said fifth chamber.

FRANK LEROY HILL.
CLIFFORD FRANCIS THOMPSON.